United States Patent [19]

Hiroyuki

[11] Patent Number: 5,553,204
[45] Date of Patent: Sep. 3, 1996

[54] IMAGE OUTPUT APPARATUS FOR GRADATION IMAGE DATA

[75] Inventor: Kaneda Hiroyuki, Kawasaki, Japan

[73] Assignee: Fujitsu Limited, Kanagawa, Japan

[21] Appl. No.: 63,958

[22] Filed: May 20, 1993

[30] Foreign Application Priority Data

May 20, 1992 [JP] Japan ................................ 4-127414

[51] Int. Cl.$^6$ ................................................ G06F 15/00
[52] U.S. Cl. .................................... 395/115; 395/109
[58] Field of Search ........................ 395/115, 112, 395/106, 116, 114, 164, 165, 166, 101, 109, 117; 358/520, 521, 523, 457, 458, 444, 448, 461, 464, 456, 518, 298, 500, 530, 474; 347/184, 183

[56] References Cited

U.S. PATENT DOCUMENTS

| | | | |
|---|---|---|---|
| 4,742,400 | 5/1988 | Tsuji | 358/284 |
| 5,142,301 | 8/1992 | Matsumoto | 346/76 PH |
| 5,195,175 | 3/1993 | Kanno et al. | 395/106 |
| 5,231,482 | 7/1993 | Murakami et al. | 358/520 |
| 5,305,122 | 4/1994 | Hayashi et al. | 358/530 |

FOREIGN PATENT DOCUMENTS 4-39780  2/1992  Japan .

*Primary Examiner*—Mark R. Powell
*Assistant Examiner*—Dov Popovici
*Attorney, Agent, or Firm*—Staas & Halsey

[57] ABSTRACT

A gradation image output apparatus in which processing speed does not decrease when binary image data is output and having a reduced memory capacity of the multi-bit bit-map planes. The image output apparatus includes both multi-bit gradation image storage and 1-bit gradation image storage. The multi-bit gradation image storage stores an image, each pixel of which has multi-bit data representing gradation level of the pixel. The 1-bit gradation image storage stores image data, each pixel of which is in one of two different gradation levels in which a gradation level of an area composed of a plurality of the pixels is represented by a ratio of pixels of one state to the other. The image output apparatus expands image data and synthesizes the expanded image data in both the multi-bit gradation image storage and the 1-bit gradation image storage.

2 Claims, 16 Drawing Sheets

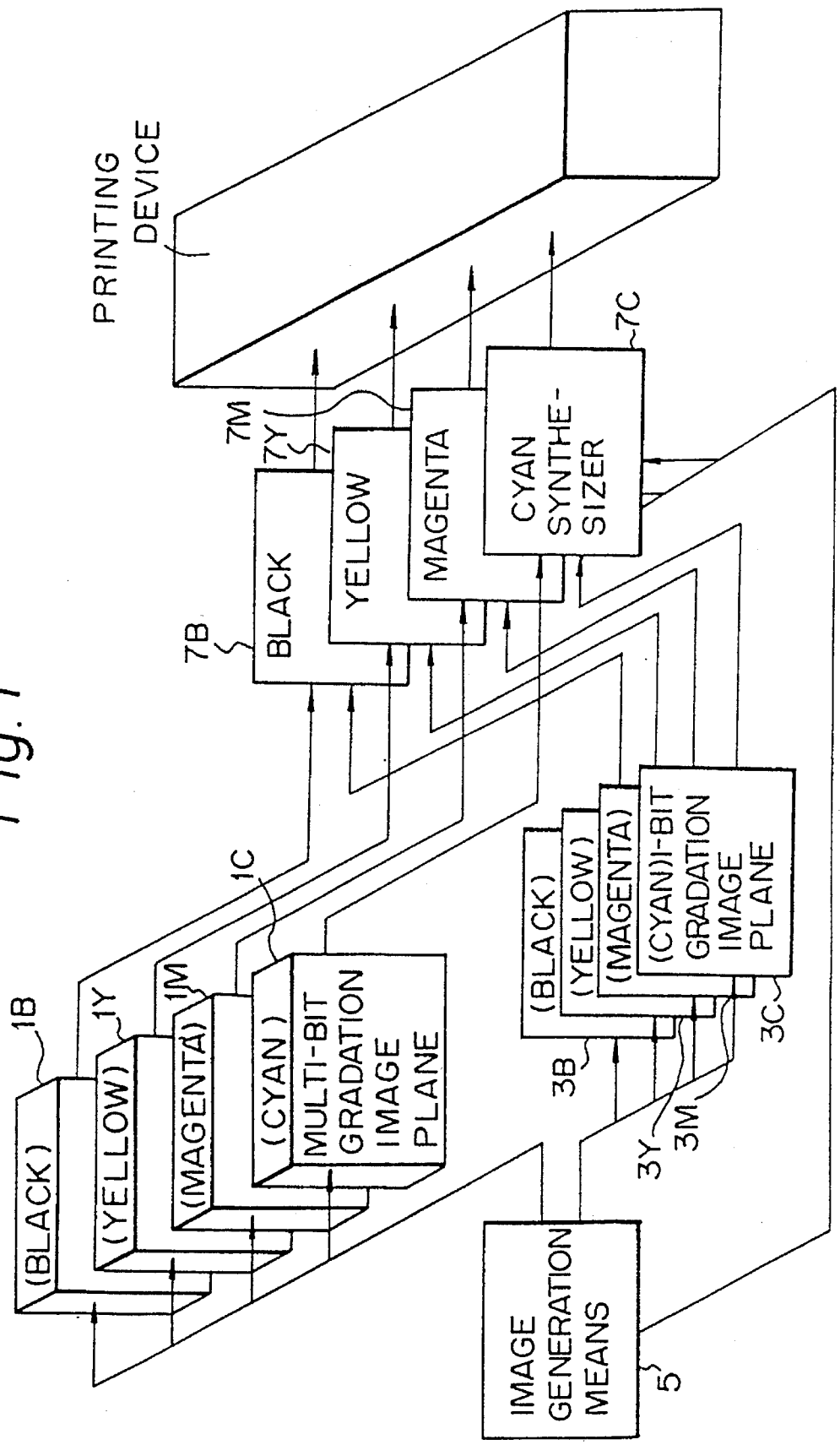

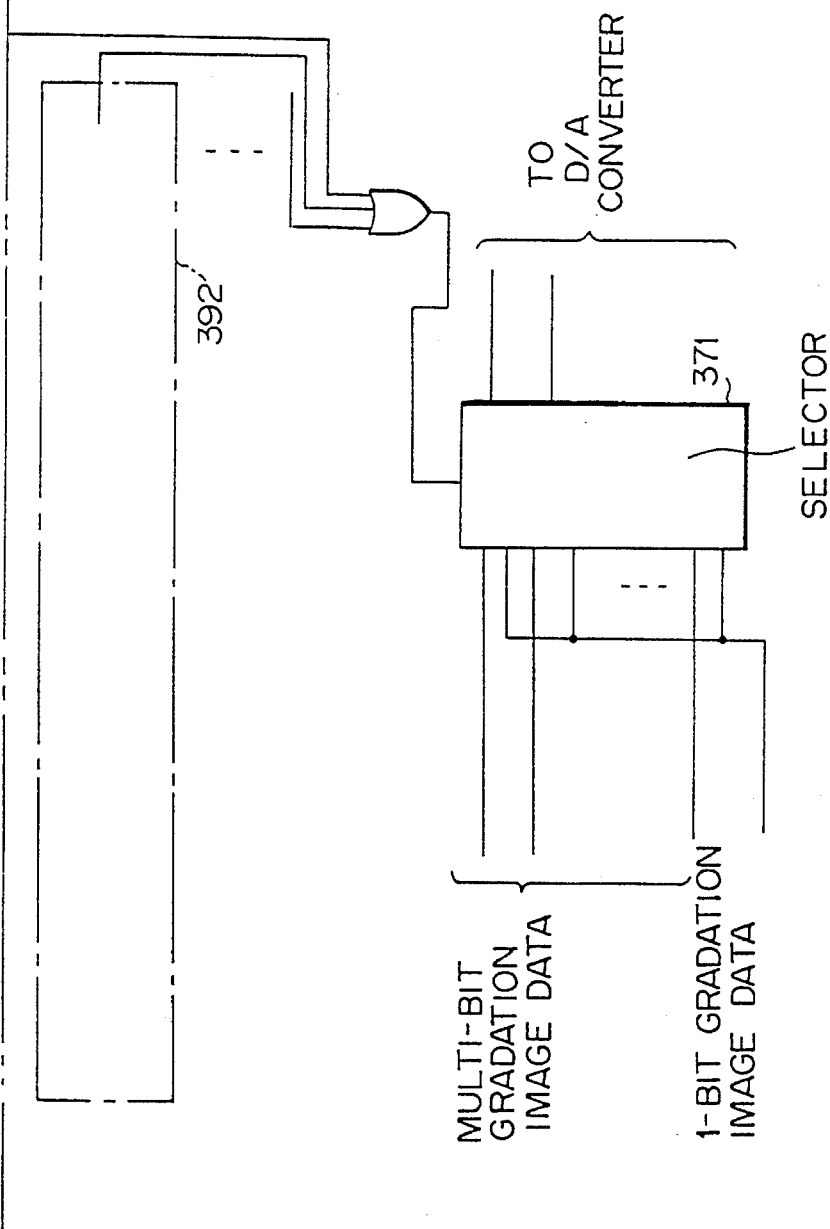

HEADER

DESCRIPTOR

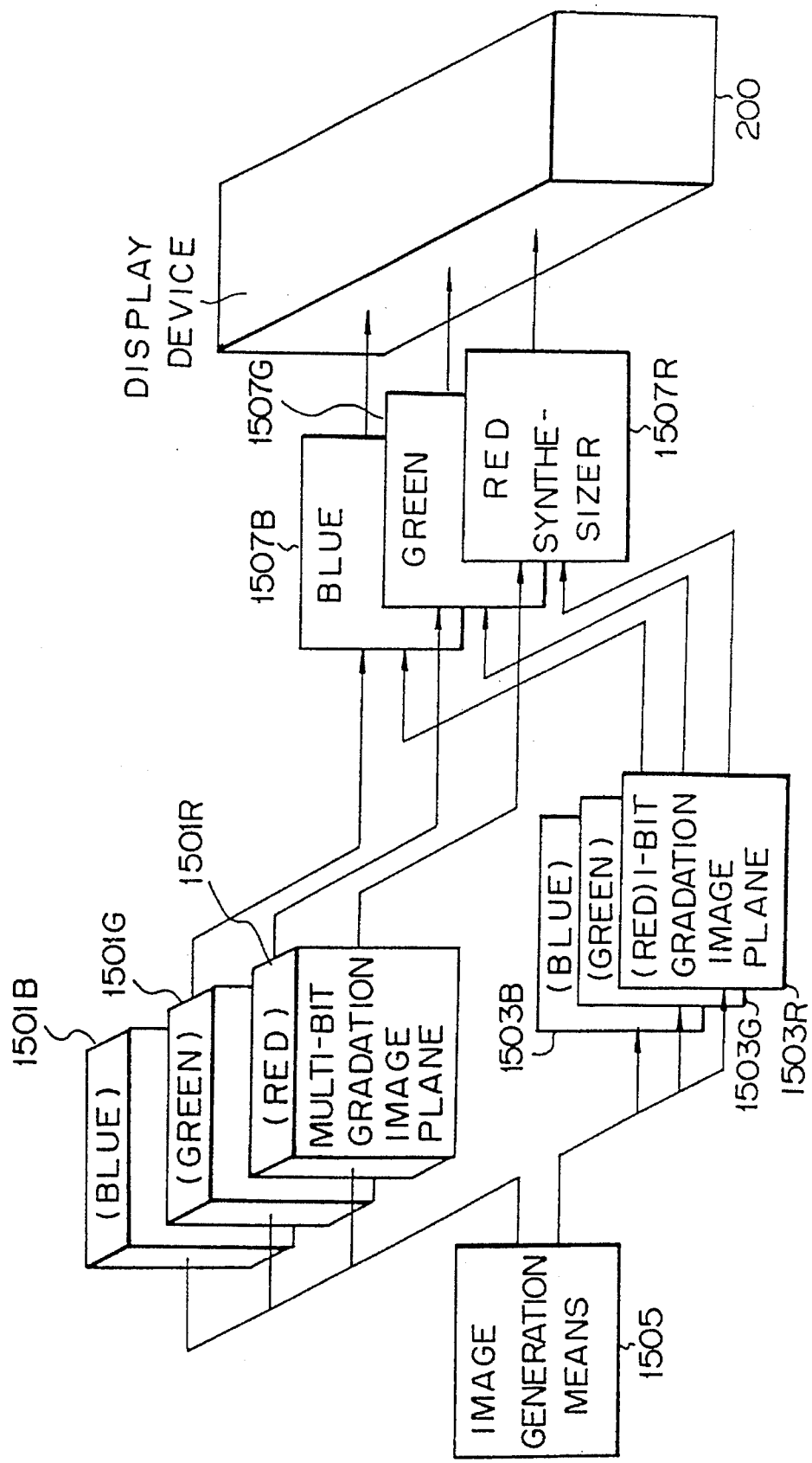

IMAGE OUTPUT APPARATUS FOR GRADATION IMAGE DATA

BACKGROUND OF THE INVENTION (1) Field of the Invention

The present invention relates to an image output apparatus for gradation image data processed in an image processing apparatus, particularly, an image output apparatus in which the gradation level of each pixel can be controlled.

(2) Description of the Related Art

Image data processed in a data processing apparatus is typically output to image output apparatuses such as a graphic display apparatus or a graphic printing apparatus.

Image output apparatuses are either a multi-bit gradation image output apparatus type or a binary image output apparatus type. In the multi-bit gradation image output apparatus, each pixel is defined by a plurality of data bits and can have a plurality of gradation levels corresponding to the data. In the binary image output apparatus, each pixel is defined by one data bit and can only have an ON or OFF state. Therefore, a gradation image can be output in the multi-bit gradation image output apparatus, however, a gradation image cannot be directly output in the binary image output apparatus.

In the multi-bit gradation image output apparatus, the gradation level of each pixel is required to be changed according to input data of the pixel. For example, when a cathode ray tube (CRT) is used as a multi-bit gradation image output display, the intensity of an electron beam can be changed at every pixel. When a laser printer is used as a multi-bit gradation image output printing apparatus, the intensity of a laser beam can be changed at every pixel and the density of each pixel is changed in proportion with the intensity of the laser beam.

In the binary image output apparatus, each pixel is only able to have two sates, ON and OFF. For example, in a printing apparatus, each pixel has one of two states, namely, whether ink is applied to an area of the pixel.

When the image output apparatus receives image data sent from an image processing apparatus such as a host computer, the image data is expanded in an image memory of the image output apparatus. Thereafter, the image data is output to a hardware device which converts image data into an actual image. The image memory has a matrix of memory bits corresponding to a whole image plane or parts of a whole image plane. The image memories are so-called bit-maps. Each pixel of binary image data is defined by one bit of data, however, each pixel of multi-bit image data is represented by a plurality of bits data, necessary to represent a number of gradation levels. Therefore, the memory capacity of the bit-map of the multi-bit image output apparatus is much larger than that of a binary image output apparatus of same bit-map size. Thus, the processing quantity of image bits of same bit-map size becomes larger in the multi-bit image output apparatus than in the binary image output apparatus. Consequently, the multi-bit image output apparatus is generally expensive compared with the binary image output apparatus.

There has been developed a method for representing gradation image in the binary bit image output apparatus. In this method, every apparent pixel unit is composed of a plurality of primitive (actual) pixels of the output apparatus and the gradation level of each unit is determined according to a ratio of ON primitive pixels included in the unit. In this specification, this method is called "1-bit gradation image method". The well-known "dither" method is a modified 1-bit gradation image method. In the 1-bit gradation image method, although a number of representable gradation levels increases in proportion to an increase of a number of primitive pixels included in a unit, resolution of the gradation image decreases.

For example, when an apparent pixel is composed of sixteen primitive pixels included in 4×4 square, $4^2+1$, namely seventeen gradation levels can be represented, however, the line resolution is reduced to ¼.

As described above, since the multi-bit gradation image output apparatus is expensive, the binary image output apparatus is widely used. Therefore, the 1-bit gradation method is widely used to represent a gradation image with the binary image output apparatus.

In a data processing system, processed results are printed onto cutforms and documents on which particular characters and frame lines are previously printed. These previously printed characters and frame lines are generally printed at low density in order to easily discriminate them from characters and numerals printer later.

Thus, in order to use normal blank papers, the previously printed characters and frame lines are required to be simultaneously printed with characters and numericals of the processed results.

When this printing operation is carried out in the binary image output apparatus, characters and frame lines are printed by the 1-bit gradation method. As described above, the representing resolution deceases when the gradation levels are represented by the 1-bit gradation method, therefore, small character and a narrow line of low density cannot be finely represented.

This problem can be avoided by using a multi-bit image output apparatus. However, as described above, since the bit-map memory of the multi-bit image output apparatus is large, the processing quantity becomes large. This causes a problem that the processing speed decreases when images other than multi-bit gradation images are printed.

Further, there are already plenty of images made by the 1-bit gradation method. When these images are reproduced by the 1-bit gradation method and output to the multi-bit image output apparatus, the multi-bit gradation image output apparatus is used as a binary gradation image output apparatus in which only two, the maximum and minimum gradation levels, of many gradation levels are used. Therefore, the resolution does not increase, and the processing quantity becomes large. For example, when image data represented by the 1-bit gradation method is output in a multi-bit gradation image output apparatus, in which each pixel can be 256 gradation levels represented by 8 bits data, 00 or FF hexadecimal bits are transferred to the memory area corresponding to each pixel as gradation data. If this transfer operation is carried out by a 16-bit data processor, data for two pixels is simultaneously transferred. When binary image data is transferred by a 16-bit data processor, data for 16 pixels are simultaneously transferred since each pixel has 1-bit data. Namely, when the multi-bit image data output apparatus is used, 8-times more processing capacity is required.

In this way, the multi-bit image data output apparatus becomes necessary when a gradation image cannot be represented in the binary image data output apparatus. However, when binary image data is output, a problem that processing speed decreases occurs.

Further, since the multi-bit image data output apparatus includes a large memory capacity, it is desired to reduce memory capacity of the multi-bit image data output apparatus.

SUMMARY OF THE INVENTION

A first object of the present invention is to realize an image output apparatus for outputting multi-bit gradation image in which processing speed is improved when binary image data is output.

A second object of the present invention is to realize an image output apparatus for outputting multi-bit gradation image in which the capacity of the multi-bit gradation image memory is reduced.

According to the first aspect of the present invention, the image output apparatus includes both multi-bit gradation image storing means and 1-bit gradation image storing means. The multi-bit gradation image storing means stores image data expanded in a form corresponding to coordinates of output image, and each pixel of the expanded image data contains multi-bit data representing gradation level of the pixel. The 1-bit gradation image storing means stores image data expanded in a form corresponding to coordinates of output image, each pixel of the expanded image data contains 1-bit data representing whether each pixel of the image data is ON or OFF, and the gradation level of an area composed of a plurality of the pixels is represented by a ratio of pixels of one state to the other. The image output apparatus further includes expansion means and synthesis means. The expansion means expands image data, sent from an image processing apparatus, into the multi-bit gradation image storing means and the 1-bit gradation image storing means according to attribute data, including kinds of said image data and expansion positions in the coordinates of output image. The synthesis means synthesizes both expanded image data in the multi-bit gradation image storing means and the 1-bit gradation image storing means.

In the image output apparatus according to the first aspect of the present invention, both the multi-bit gradation image storing means and the 1-bit gradation image storing means are included, therefore, image data each pixel of which has multi-bit data can be expanded in the multi-bit gradation image storing means and image data which have 1-bit gradation image data can be expanded in the 1-bit gradation image storing means. Namely, image data can be appropriately expanded according to the characteristices of the data.

According to the second aspect of the present invention, the image output apparatus includes both first and second 1-bit gradation image storing means. The first 1-bit gradation image storing means stores image data expanded in a form corresponding to coordinates of output image, and each pixel of the expanded image data contains 1-bit data representing that the pixel is in either state of two different gradation levels. The second 1-bit gradation image storing means stores image data expanded in a form corresponding to coordinates of output image, each pixel of the expanded image data contains 1-bit data representing whether each pixel of the image data is ON or OFF, and a gradation level of an area composed of a plurality of the pixels is represented by a ratio of pixels of one state. The image output apparatus further includes a register, expansion means and synthesis means. The register stores gradation level data which indicates gradation level of the image data expanded in the first 1-bit gradation image storing means. The expansion means expands image data sent from an image processing apparatus into the first 1-bit gradation image storing means and the second 1-bit gradation image storing means according to attribute data including kinds of the image data and expansion positions in the coordinates of output image. The synthesis means synthesizes both expanded image data in the first 1-bit gradation image storing means and the second 1-bit gradation image storing means. Further, the synthesis means includes conversion for converting the image data expanded in the first 1-bit gradation image storing means into expanded image data having gradation level corresponding to the gradation level data stored in the register.

In an application in which processed image data is output on paper on which particular characters and frame lines of low density are previously printed, the particular characters and frame lines may be printed at a predetermined density. Namely, although their densities are low, they need not necessary to be changable. In the image output apparatus according to the second aspect of the present invention, the register which defines the gradation level of the expanded image data in the first 1-bit gradation image storing means is included, therefore, the expanded image data of the first 1-bit gradation image storing means can be printed at desired density. Consequently, when the image data of the particular characters and frame lines of low density are expanded in the first 1-bit gradation image storing means, these image can be reproduced at fine resolution and desired density.

BRIEF DESCRIPTION OF THE DRAWINGS

The present invention will be more clearly understood from the description as set forth below with reference to the accompanying drawings, wherein:

FIG. 1 is a block diagram of a color image printing apparatus in accordance with a first through third embodiments of the present invention;

FIGS. 3A and 3B are circuit diagrams of a synthesizer and a synthesis controller in accordance with the first embodiment of the present invention;

FIG. 15 is a block diagram of a color display apparatus in accordance with a preferred embodiment of the present invention.

DESCRIPTION OF THE PREFERRED EMBODIMENTS

The present invention can be applied to both a display apparatus and a printing apparatus, and further, it can also be applied to a monochrome image output apparatus or a color image apparatus. Preferred embodiments of the present invention which are applied to a color printing apparatus are explained hereinafter.

In a color image apparatus, image data sent from a host computer is expanded in bit-map planes, and then output. In the color image display, image data expanded in three bit-map planes is simultaneously output from the three bit-map planes in parallel. In the color printing apparatus, image data expanded in three or four bit-map planes is simultaneously output in parallel or is sequentially output. However, in some types, expanded image data is output in parallel, but not simultaneously. In these types, image data expanded in three or four bit-map planes is required to be independently output from the bit-map planes. The present invention can be applied to every type. In the following, embodiments of a color printing apparatus in which four groups of image data are simultaneously output in parallel are explained.

In a color printing apparatus, three kinds of ink, cyan, magenta and yellow, are used. The quantity of each ink delivered to each pixel can be independently changed. White is represented by the color of the printing paper, and every color can be obtained by changing the ratios of ink. Black is obtained by delivering every ink at a maximum quantity. Usually, in order to clearly represent black, black ink is also used, namely, four kinds of ink are used.

FIG. 1 shows a fundamental constitution common to every color printing apparatus of first to third embodiments.

In FIG. 1, references symbols 1C, 1M, 1Y and 1B respectively designate cyan, magenta, yellow and black multi-bit gradation image planes in which multi-bit gradation image data of each color ink is expanded. Cyan, magenta, yellow and black 1-bit gradation image planes 3C, 3M, 3Y and 3B respectively, are 1-bit gradation image planes in which 1-bit gradation image data of each color ink is expanded. An image generating means 5 receives image data from an image data processing apparatus and respectively expands the image data in every multi-bit and 1-bit gradation image planes. A set of cyan, magenta, yellow and black synthesizers 7C, 7M, 7Y and 7B, respectively, synthesizes two expanded images in the multi-bit gradation image plane and 1-bit gradation image plane when the expanded image data is output. Elements described above constitute an electrical image generation portion. A printing device 100 converts the electrical image into a printed image.

Figure 2A:
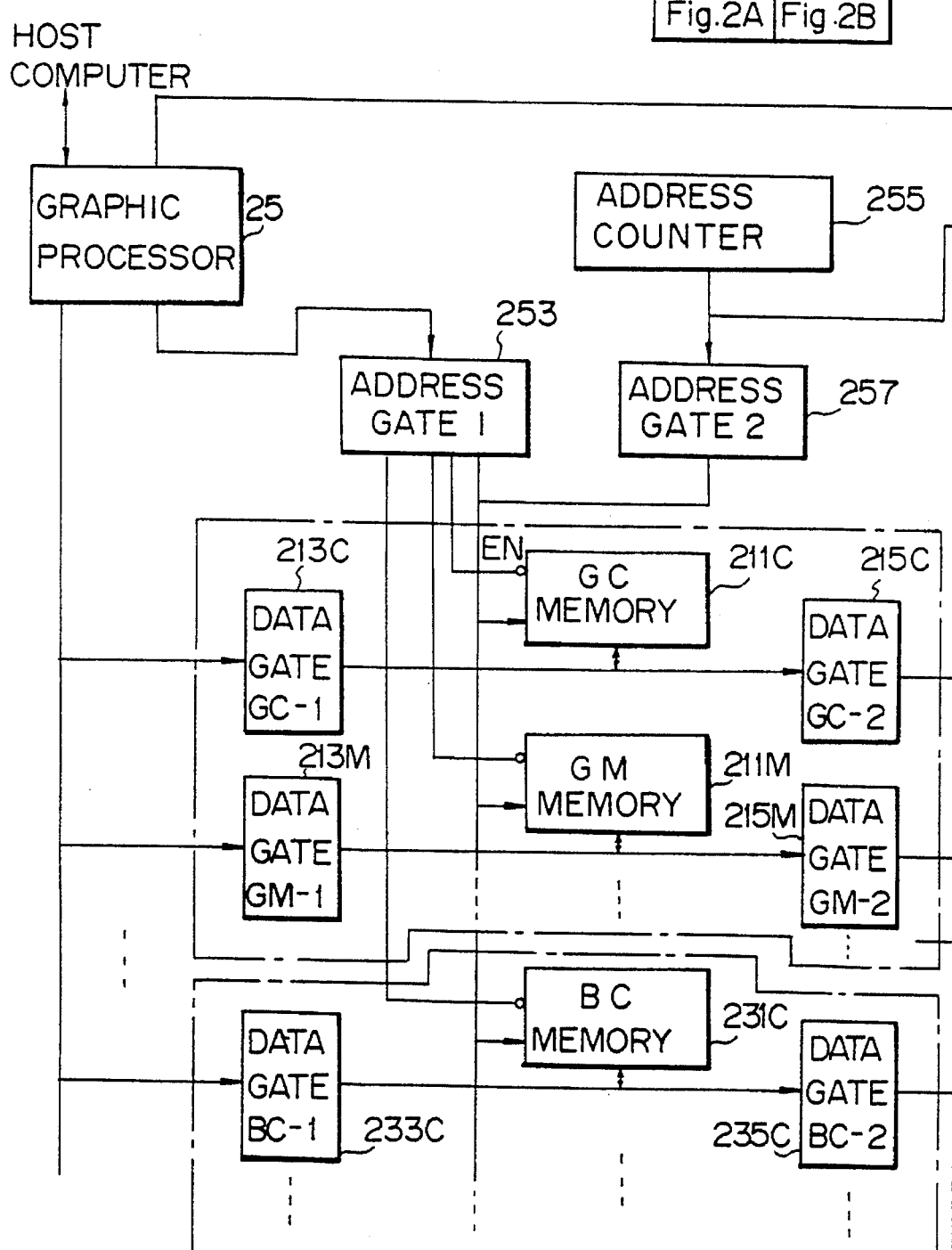
FIGS. 2A and 2B are block diagrams of a color image printing apparatus in accordance with the first embodiment of the present invention.
Figure 2B:
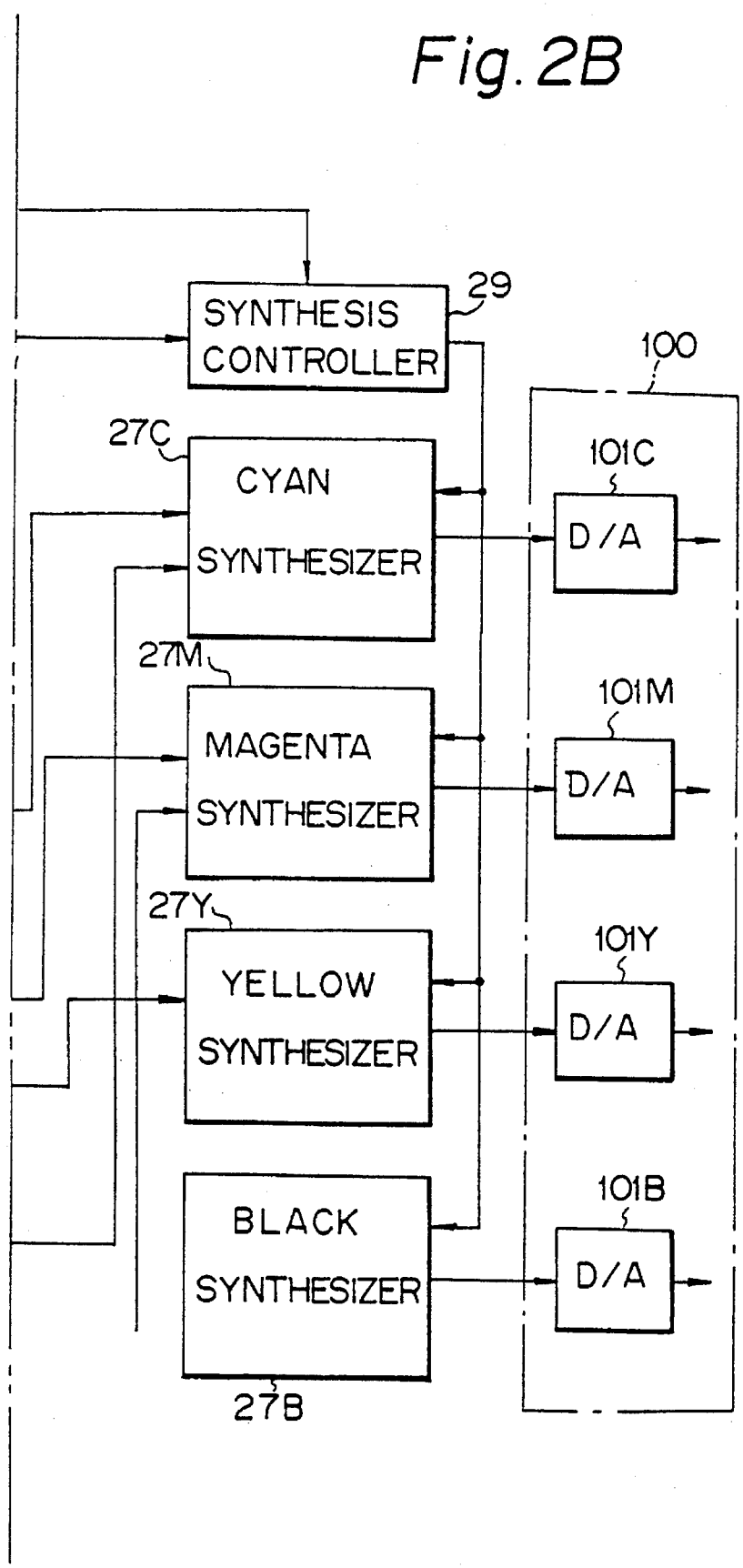
Figure 3A:
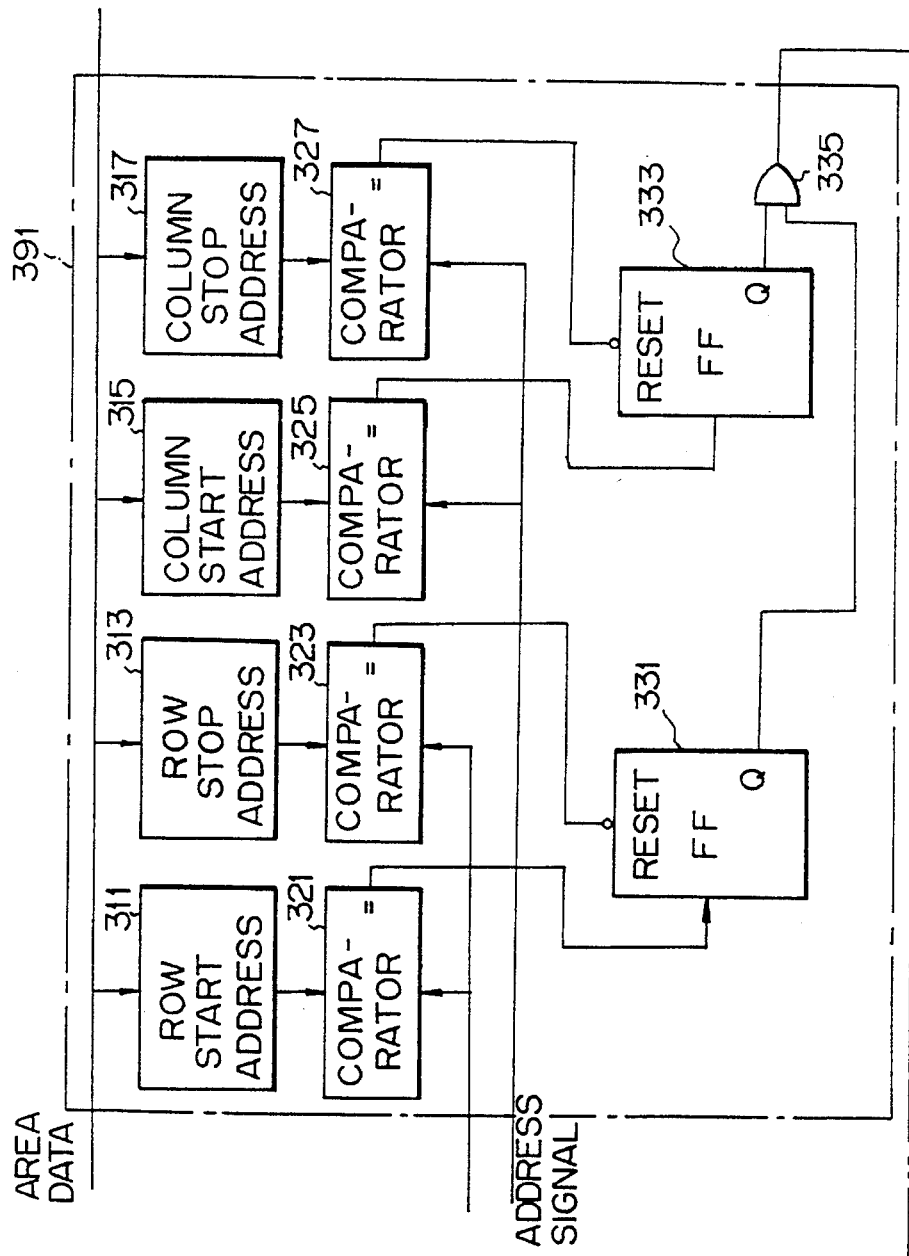

FIGS. 2A and 2B are detailed block diagrams showing a color printing apparatus in accordance with a first preferred embodiment of the present invention. FIGS. 3A and 3B are circuit diagrams of a synthesizer and a synthesis controller in accordance with the first preferred embodiment of the present invention.

In FIG. 2, a multi-bit image memory 211C corresponds to cyan ink which has a bit-map construction corresponding to a whole output image area and stores an expanded multi-bit gradation image data. A first data gate 213 C of the cyan multi-bit image memory 211C opens only when a graphic processor 25 expands image data into the cyan multi-bit gradation image memory 211C. A second data gate 215C of the cyan multi-bit image memory 211C, opens only when the expanded image data is output from the image data planes. These elements form a cyan multi-bit gradation image plane. There are another three multi-bit gradation image planes similar to this cyan multi-bit gradation image plane respectively corresponding to magenta ink, yellow ink and black ink.

A 1-bit image memory 231C, corresponding to cyan ink, has a bit-map construction corresponding to an output image and stores an expanded 1-bit image data. A first data gate 233C of the cyan 1-bit image memory 231 opens only when the graphic processor 25 expands the image data into the cyan 1-bit image memory 231C. A second data gate 235C of the cyan 1-bit image memory 213C opens only when the expanded image data is output from the image data planes. These elements also form a cyan 1-bit gradation image plane. There are also another three 1-bit gradation image planes corresponding to magenta ink, yellow ink and black ink.

The graphic processor 25 receives image data from a host computer and expands the received image data into the multi-bit gradation image planes and the 1-bit gradation image planes. A first address gate 253 opens only when the graphic processor 25 expands image data into the multi-bit gradation image planes. An address counter 255 generates an address signal when the image data is output from the image planes. A second address gate 257 opens only when the image data is output from the image planes.

Referring to FIG. 2A, a set of synthesizers 27C, 27M, 27Y and 27B, corresponding to cyan, magenta, yellow and black image data, synthesize the multi-bit image data and the 1-bit image data. A synthesis controller 29 controls the synthesizers 27C, 27M, 27Y and 27B.

A printing device 100 converts the electrical image into a printed image. The printing device 100 can independently control the density of each pixel by changing an amplitude of an analog signal, therefore, four digital-to-analog converters 101C, 101M, 101Y and 101B are necessary.

FIGS. 3A and 3B show a detailed constitution of one of the synthesizer 27C, 27M, 27Y, 27B and the synthesis controller 29. In this embodiment, 1-bit image data are normally output, and, in some rectangular areas, multi-bit image data is output instead of 1-bit image data. A set of address registers 311, 313, 315 and 317, respectively, store addresses of the rectangular area. The register 311 stores an address of upper edge of the rectangular area, the register 313 stores an address of lower edge of the rectangular area, register 315 stores an address of left edge of the rectangular area, and the register 317 stores an address of right edge of the rectangle area. A set of comparators 321, 323, 325 and 327 compare values stored in the registers 311, 313, 315 and 317 with an address signal. The comparators 321, 323, 325 and 327 output pulse signals when the address signal coincides with the stored values. An output of a flip-flop 331 turns ON when the address signal coincides with the upper edge address and turns OFF when the address signal coincides with the lower edge address. In the same way, an output of a flip-flop 333 turns ON when the address signal coincides with the left edge address and turns OFF when the address signal coincides with the right edge address. Therefore, the output of an AND gate 335 is ON when image data in the rectangular area is output. In this way, these elements form a circuit 391 which generates a signal to switch output data from the 1-bit gradation image data to the multi-bit gradation image data. When a number of rectangular areas is predetermined, the number of circuits similar to this circuit 391 exist.

Referring to FIG. 3B, selector 321 selects output data between the multi-bit gradation image data read from the multi-bit bit-map planes and the 1-bit gradation image data read from the 1-bit bit-map planes. The selector 371 corresponds to the synthesizer. As shown in the figure, the selector is preferably an 8-bit selector, and the 1-bit gradation image data is commonly input to input terminals on one side. Therefore, the 1-bit gradation image data becomes hexadecimal data "00" (8-bits) when it is "0", and it becomes hexadecimal data ("FF") when it is "1".

When four kinds of image data expanded in four image planes are sequentially output, one synthesizer can be commonly used by switching four kinds of input data from the four image planes and by distributing output data to the D/A converters 101C and 101M, 101Y and 101B. Further, when four kinds of image data expanded in four image planes are output in parallel but not simultaneously, one address counter 255 and one address gate 257 are needed for each image plane.

Next, expansion and output operations of image data in the apparatus shown in FIGS. 2 and 3 will be discussed.

Figure 4:
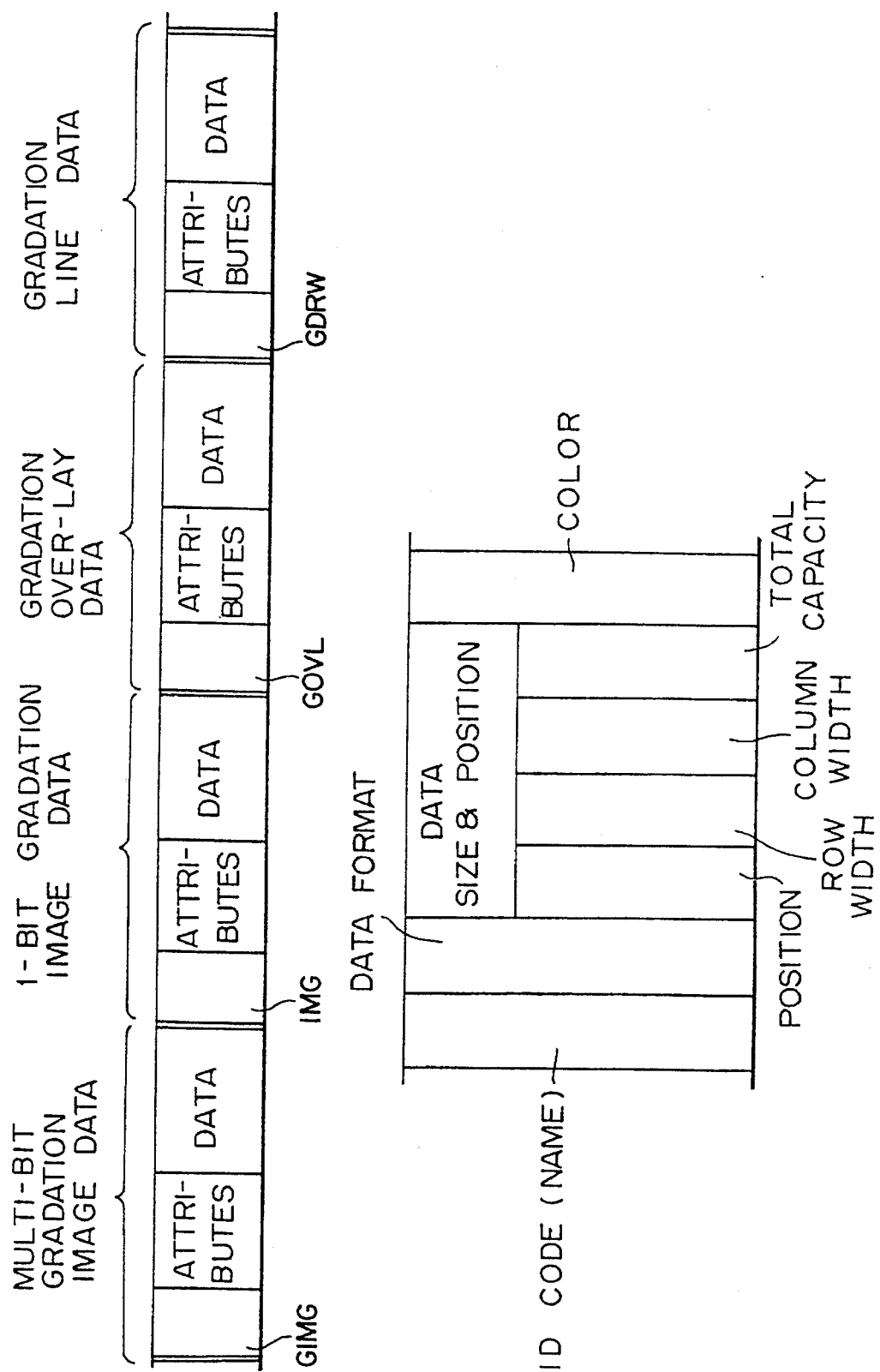
FIG. 4 is a diagram of image data sent from a host computer in accordance with the first embodiment of the present invention.

FIG. 4 shows a construction of the image data sent from the host computer in accordance with a first preferred embodiment of the present invention. As shown in FIG. 4, image data is composed of several blocks corresponding to kinds of image data, such as character data, graphic image data, overlay data and line data. The data is further divided into multi-bit data and 1-bit data. Every image data can be printed as multi-bit data or 1-bit data. Namely, the 1-bit gradation image planes are also used to expand 1-bit image data, except for the 1-bit gradation image data. Each data block is composed of discrimination data ("GIMG" "IMG" "GOVL" "GDRW") indicating the kind of data including its block, attribute data and image data. The attribute data includes an identification code (name), data format information, data size and position information and color information. The data size and position information indicate a total size of the image data, edge positions of a rectangle in which the image data is expanded, and the sizes of the rectangle. The color information indicates one of cyan, magenta, yellow and black.

The graphic processor 25 interprets this information and expands the image data according to the interpreted information. When the graphic processor 25 expands image data into the image planes, every first data gate and the first address gate 253 open and every second data gate and the second address gate 257 close. Accessed memory is activated by an address signal supplied through the first address gate 253, and the image data is written into the accessed memory. After the image data is expanded in the bit-map planes, edge positions of the rectangular areas in which multi-bit image data is expanded are written into the registers in FIG. 3.

The expanded image data of a pair of corresponding multi-bit and 1-bit image planes are simultaneously output from a pair of multi-bit and 1-bit image planes. In this output operation, every first data gate and the first address gate 253 close and every second data gate and the second address gate 257 open. Then, address signals, generated in the address counter 255, are supplied through the second address gate 257, and image data is output through the second data gate 215 and 235. The image data output from the image planes is synthesized in the synthesizer 27.

In this embodiment, the 1-bit image data is normally output, and, in the rectangular areas, the multi-bit image data is output instead of the 1-bit image data. However, conversely, the multi-bit image data can be normally output, and, in the rectangle areas, the 1-bit image data can be output instead of the multi-bit image data.

In the first embodiment, each image data memory has a capacity corresponding to a whole output image area, therefore, the capacity of the total memory system becomes very large. In a second embodiment, the capacity of the total memory system is reduced.

Figure 5:
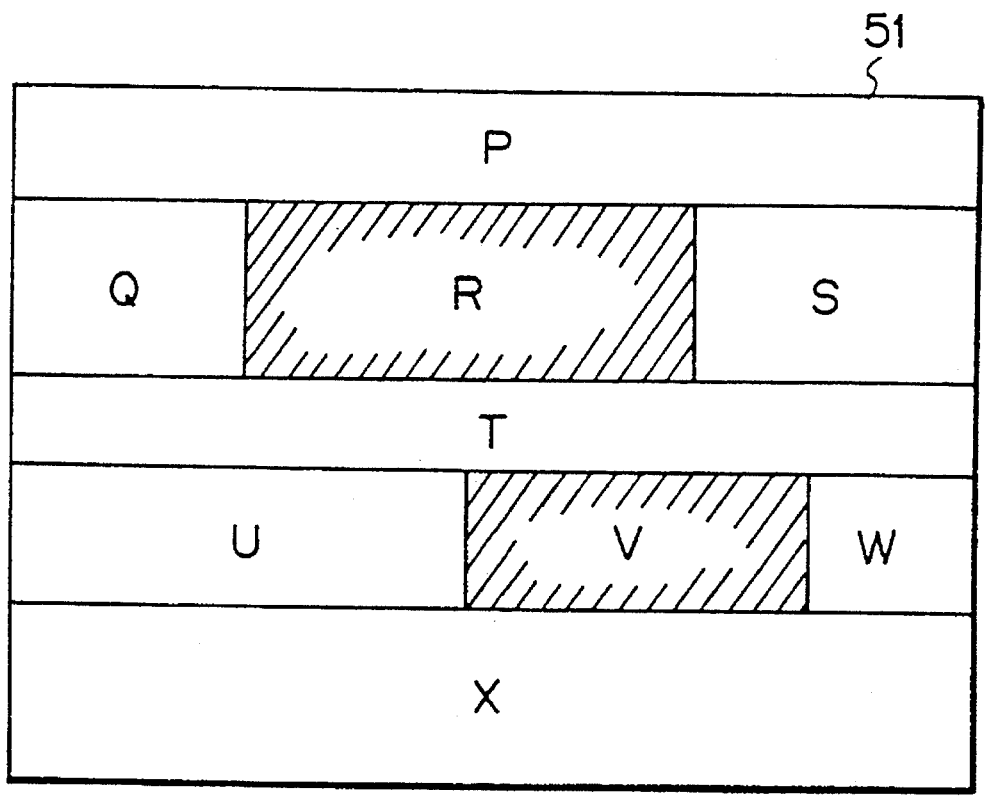
FIG. 5 is a diagram showing an arrangement of multi-bits image data and 1-bit image data in a second embodiment.

FIG. 5 is a diagram of multi-bit image areas and 1-bit image areas in a complete output image area in accordance with the second preferred embodiment of the present invention. In FIG. 5, areas R and V designate multi-bit image areas and areas P, Q, S, T, U, W, and X correspond to 1-bit image areas.

Figure 6:
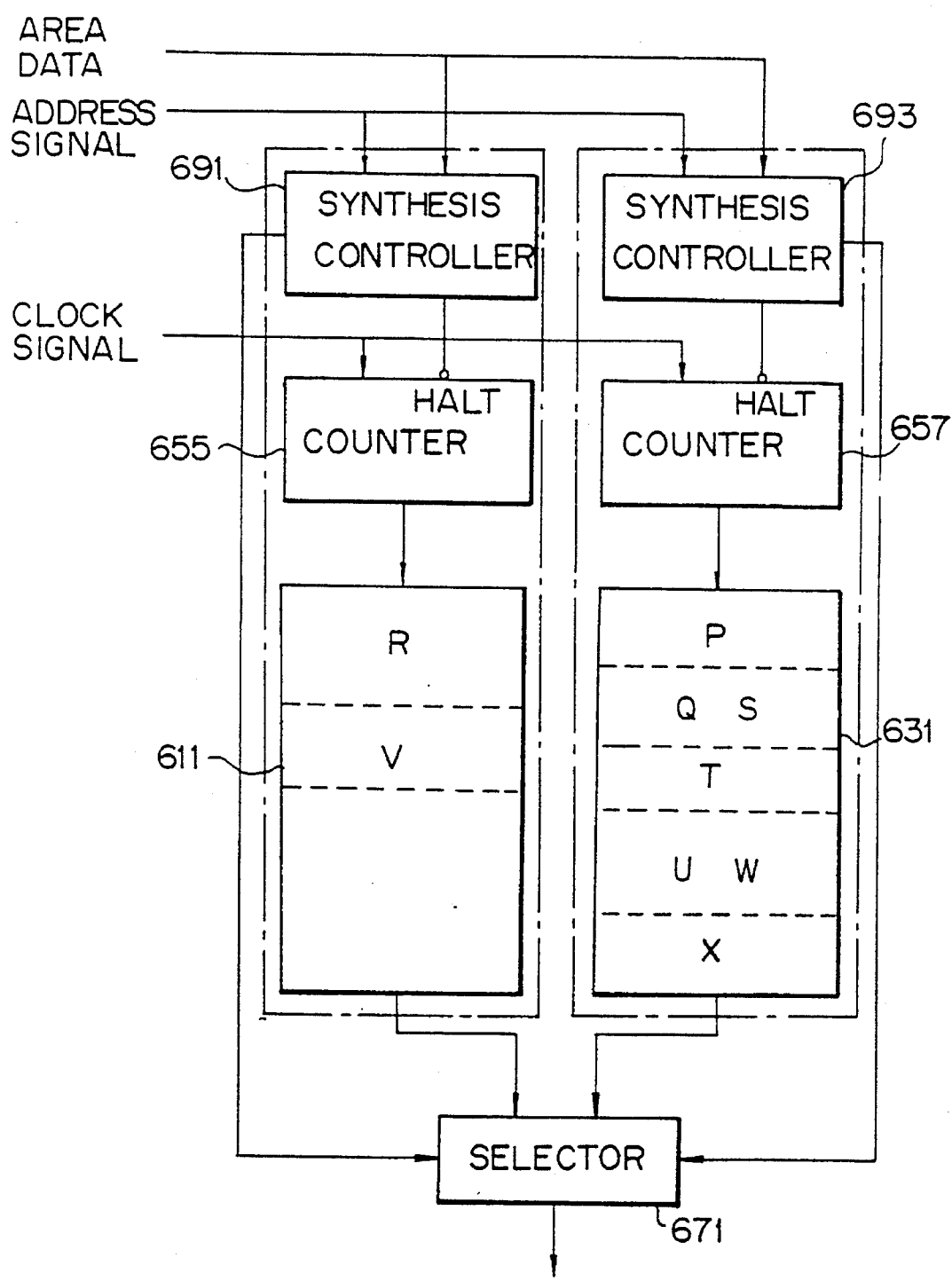
FIG. 6 is a circuit diagram of image planes and synthesizers of a color image printing apparatus in accordance with the second embodiment of the present invention.

FIG. 6 is a diagram of a multi-bit image memory 611, a 1-bit image memory 631, address counters 655 and 657, a selector 671 for a synthesizer and synthesis controllers 693 in accordance with the second preferred embodiment of the present invention. The image memories and the synthesizer are shown only as one pair corresponding to each color.

Image data of each area is arranged in multi-bit and 1-bit image memories as shown in FIG. 5. The synthesis controllers 691, 693 and the selector 671 are same as those of FIG. 3. The synthesis controller 691 output a switching signal which is ON in R an V areas. This signal is applied to the selector 671. An inverted signal of the signal is applied to a halt input of the address counter 655. Therefore, the address counter 655 operates only when multi-bit image data is output. In this way, multi-bit image data can be precisely output so as to be arranged in the rectangular areas. The synthesis controller 693 operates in the same way. If the 1-bit image data is always output when the multi-bit image data is not output, an inverted output signal of the synthesis controller 691 can be used, therefore, the synthesis controller 693 can be omitted.

In the above embodiments, the synthesizer and the synthesis controller are formed by logical circuit elements. However, advanced graphic processors having many functions are on the market, and the apparatus can be realized by these graphic processors.

A third preferred embodiment of the present invention is an example in which such a graphic processor is used.

Figure 7:
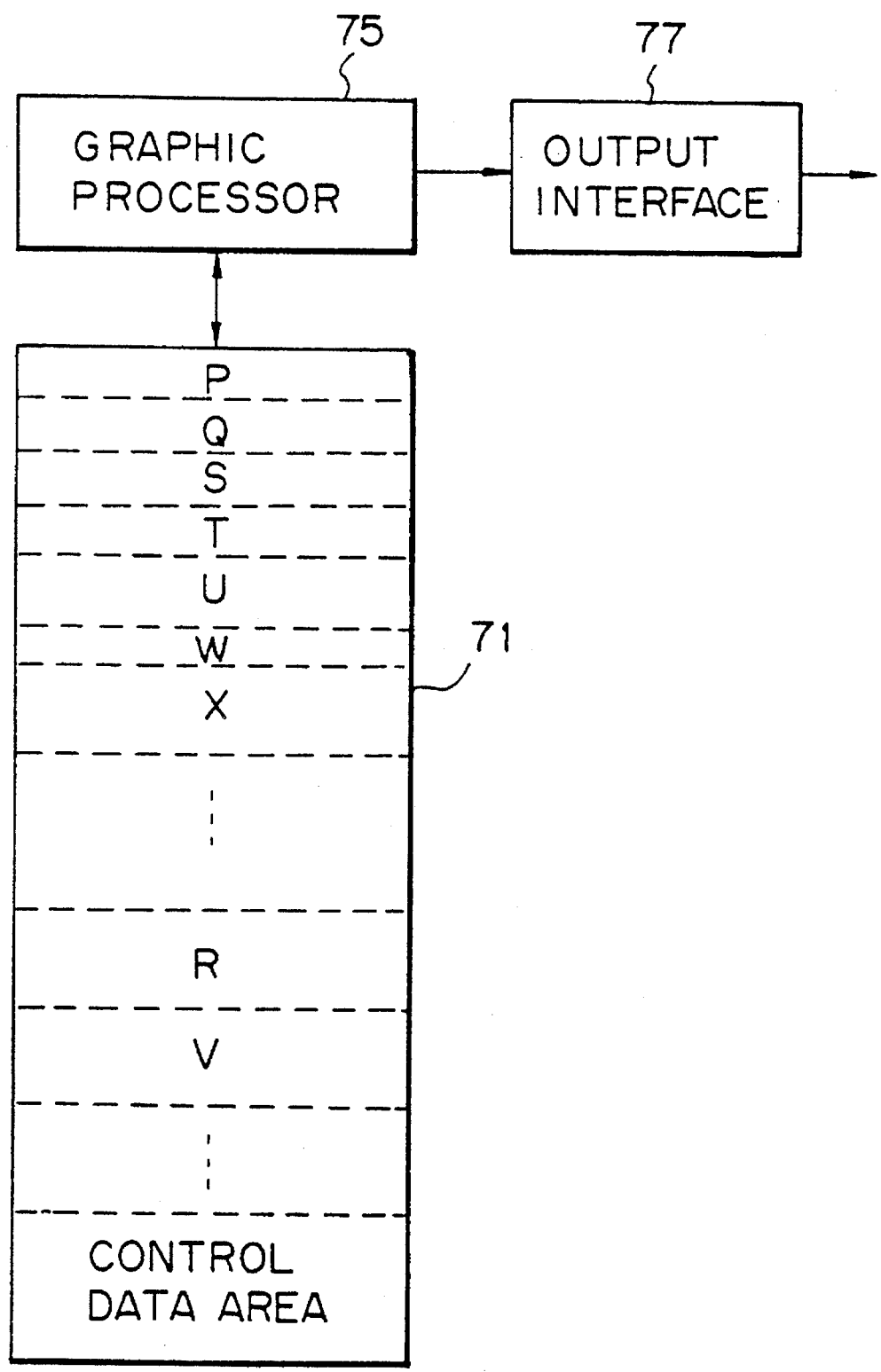
FIG. 7 is a diagram of a color image printing apparatus in accordance with the third embodiment of the present invention.

FIG. 7 is a diagram showing a constitution of a color printing apparatus in accordance with a third preferred embodiment of the present invention. The color printing apparatus generally comprises an image memory 71, a graphic processor 75, and an output interface 77. A portion of FIG. 7 corresponds to everything, except the printing device 100, in FIG. 1.

Areas P to X in FIG. 7 correspond to the areas P to X in FIG. 5. As shown in FIG. 7, the multi-bit image data and the 1-bit image data are arranged in the same memory. The graphic processor 75 stores pointers showing address positions of both types image data and arrangement information of every rectangular area shown in FIG. 5. Further, the graphic processor 75 reads and outputs image data according to above information.

Figure 8:
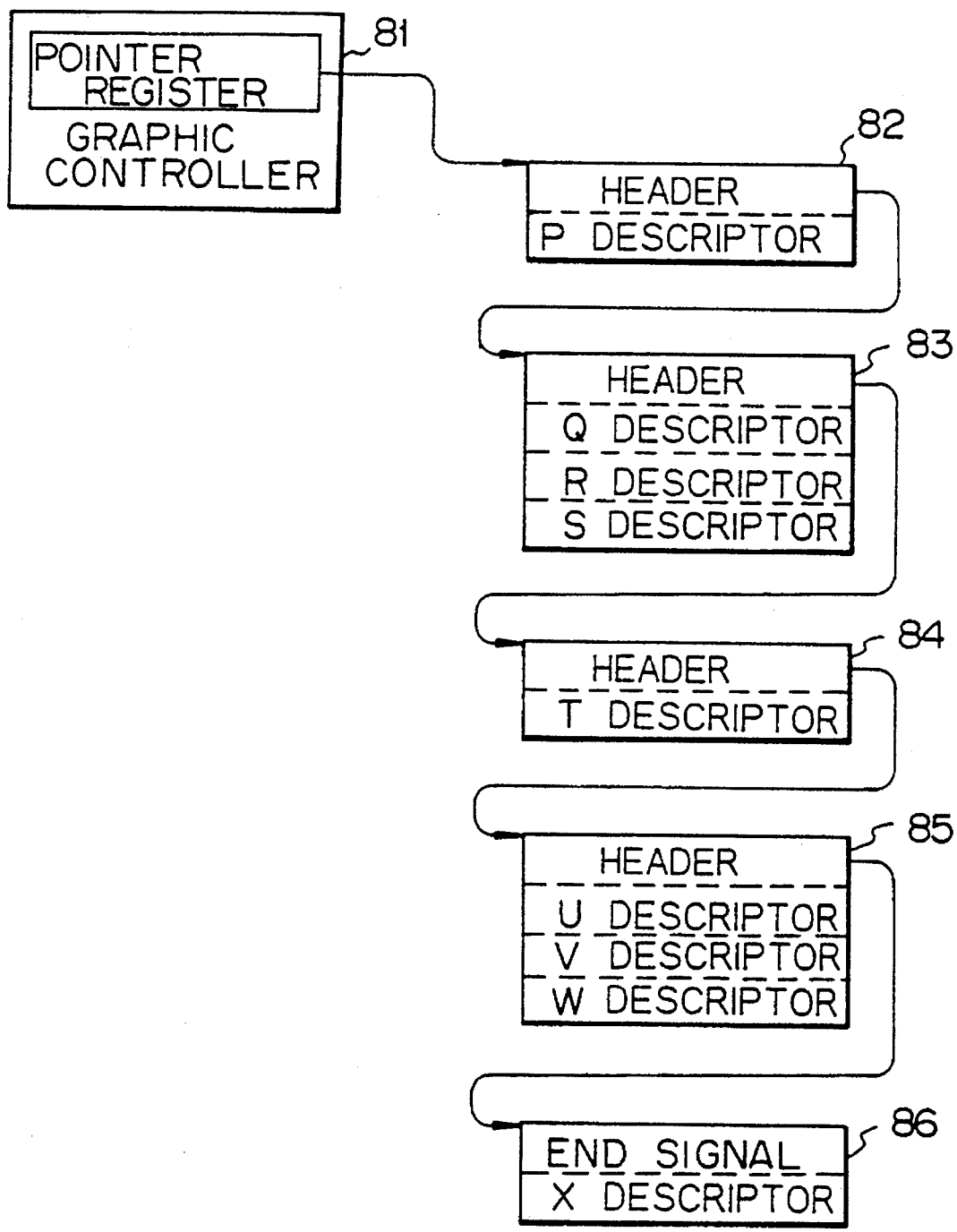
FIG. 8 is a diagram of control data and a control operation of a graphic processor in accordance with the third embodiment of the present invention.
Figure 9:
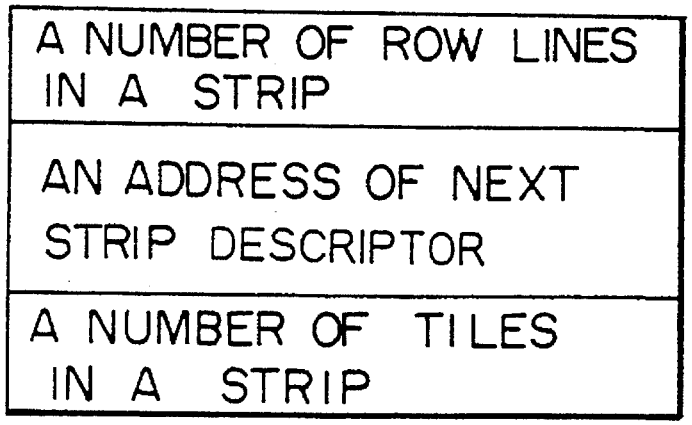
FIG. 9 is a diagram of a header of the control data in accordance with the third embodiment of the present invention.
Figure 10:
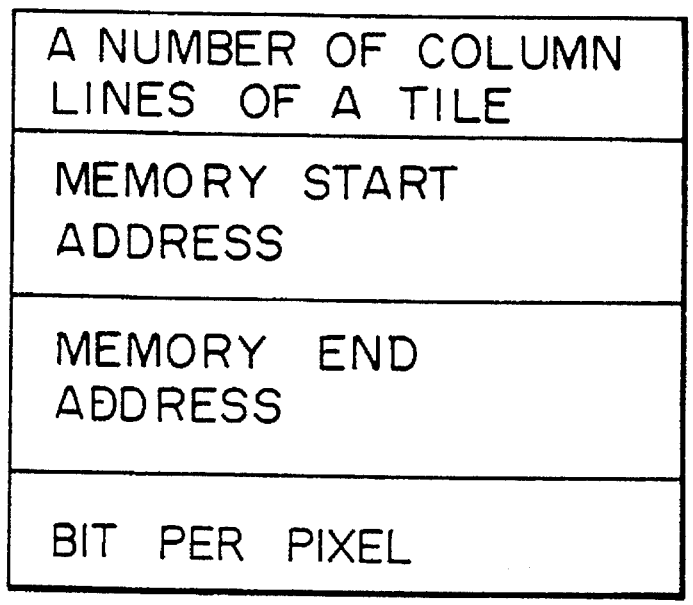
FIG. 10 is a diagram of a descriptor of the control data in accordance with the third embodiment of the present invention.

FIG. 8 is a diagram explaining the color printing apparatus in accordance with the third preferred embodiment of the present invention. FIGS. 9 and 10 show the construction of a header and a descriptor set forth in FIG. 8. In the following, an example is shown of when a whole output image area is divided into rectangular areas as set forth in FIG. 5.

The rectangular areas of FIG. 5 are divided into five strips in vertical direction, and areas corresponding to references P to X are called tiles. Namely, a first strip includes a tile, a second strip includes tiles Q, R and S, a third strip includes tile T, a fourth strip includes tiles U, V and W, and a fifth strip includes tile X. A pointer register 81 of the graphic processor indicates strip information relating to the first strip 82. The strip information includes a header and one or more descriptors. As shown in FIG. 9, the header is composed of a number of row lines in the strip, an address of next strip descriptor, and a number of tiles in the strip. As shown in FIG. 10, the descriptor is composed of a number of column lines of a tile, memory start address, memory end address, and bits per pixel. The graphic processor reads and outputs image data in the first strip according to this information. After every image data in the first strip are output, the graphic processor detects an address of the second strip descriptor 83 and same operations are repeated. Then, these operations are repeated for each strip 84, 85 and 86 until the last strip 86.

Figure 11:
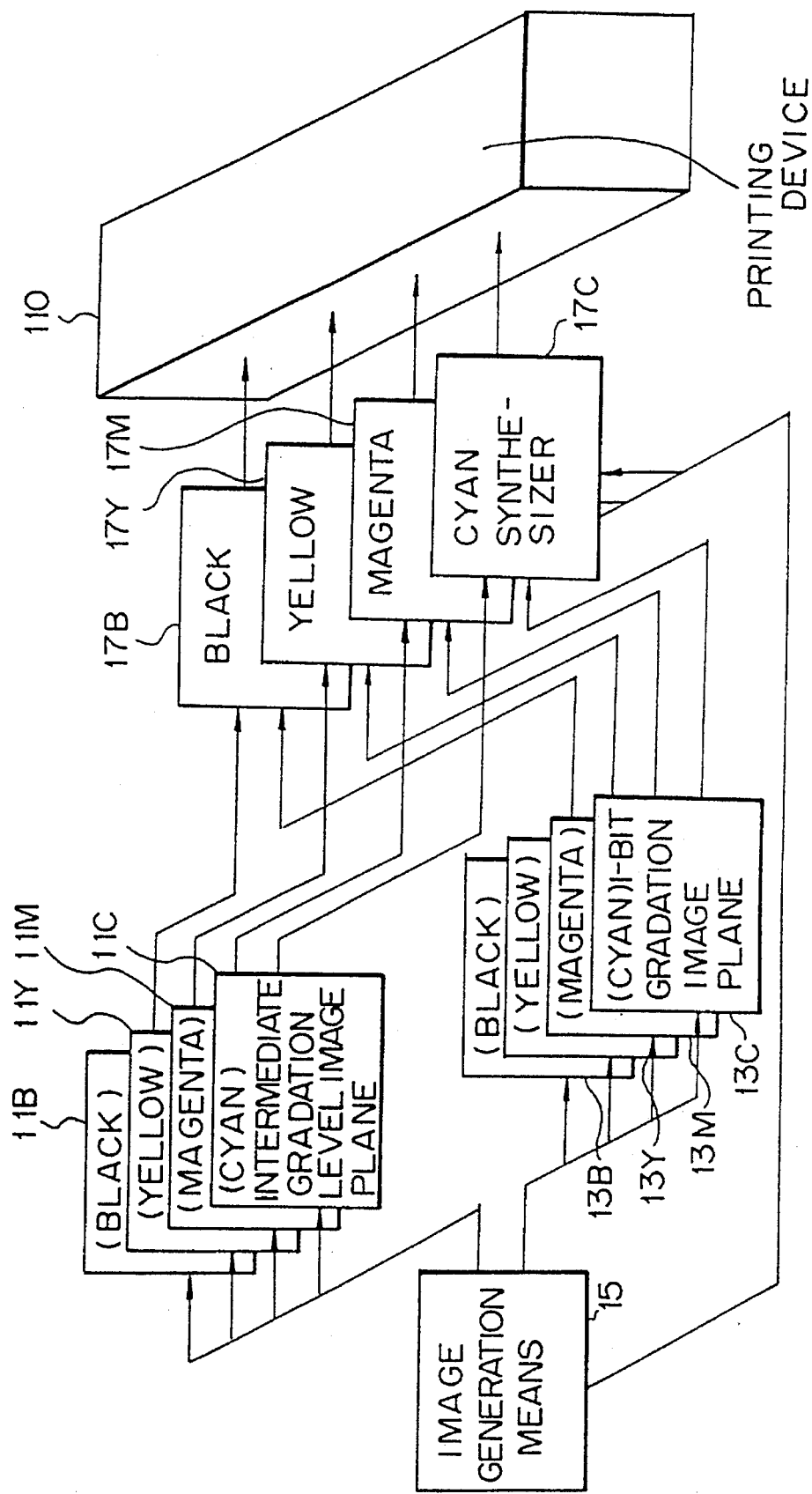
FIG. 11 is a block diagram of a color image printing apparatus in accordance with a fourth embodiment of the present invention.
Figure 12:
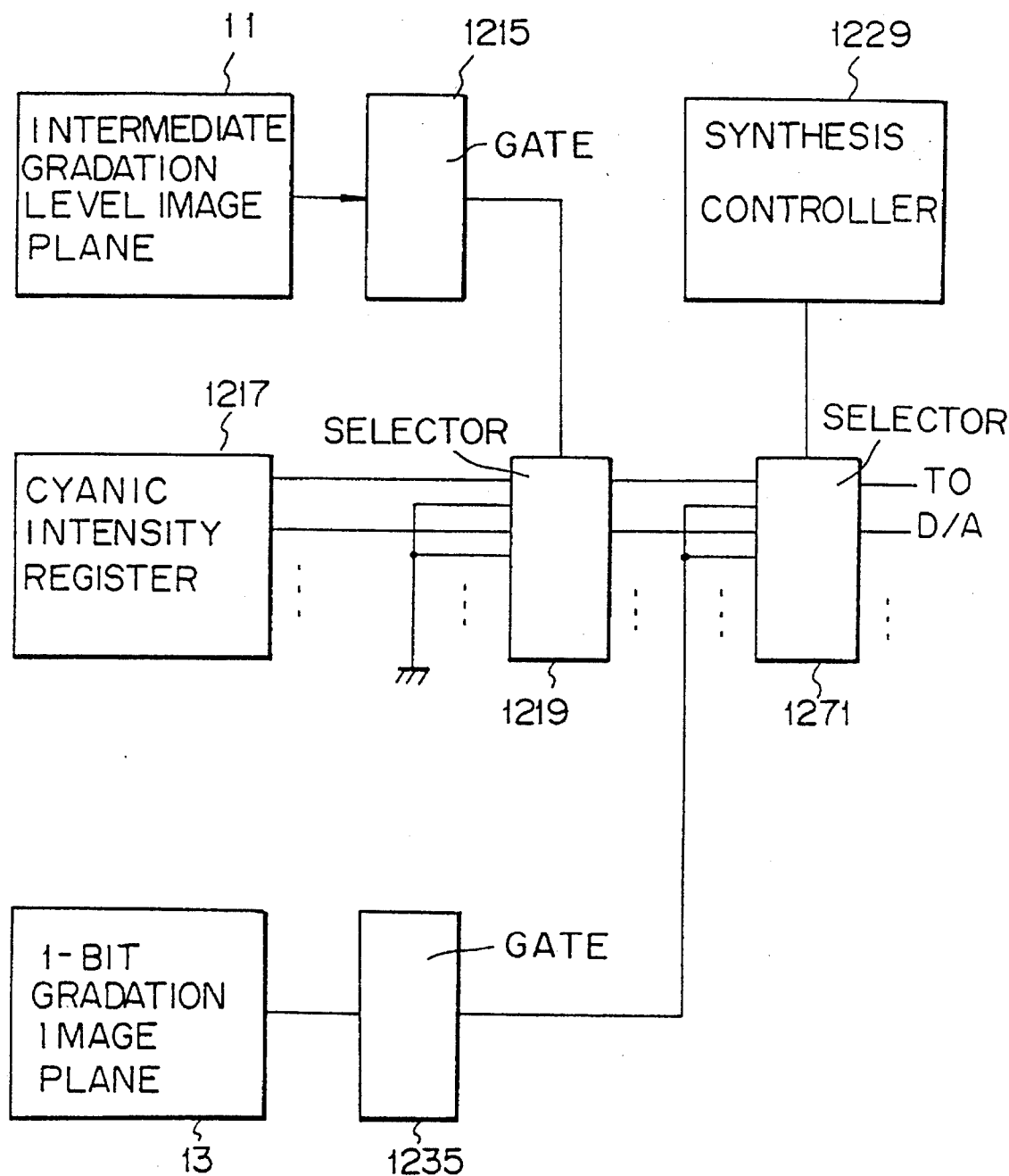
FIG. 12 is a circuit diagram of the color image printing apparatus in accordance with the fourth embodiment of the present invention.

FIG. 11 is a diagram showing a color printing apparatus in accordance with a fourth preferred embodiment of the present invention. FIG. 12 is a circuit diagram showing a portion of the color printing apparatus in accordance with the fourth preferred embodiment of the present invention corresponding to cyan image data.

In this embodiment, multi-bit gradation image planes 11C, 11M, 11Y and 11B are 1-bit image planes. As described above, processed image data is output on paper, on which particular characters and frame lines at low density are previously printed. Particular characters and frame lines are only required to be printed at a desired density and the density of each pixel is not required to be changable. Therefore, when the whole image can be printed at the desired density, these image can be represented by 1-bit image data. In the apparatus of FIG. 12, the 1-bit image data can be printed at the desired density.

In FIG. 12, an intermediate gradation level image plane 1 holds expanded image data to be printed at a desired density. A second data gate 1215 is provided for the intermediate gradation level image plane. A 1-bit gradation image plane is provided with a second data gate 11235 of the 1-bit gradation image plane. A selector 1271 of the synthesizer and a synthesis controller 1229 are also provided. The selector 1271 and the synthesis controller 1229 are same to those set forth with respect to FIG. 3.

A cyan intensity register 1217 stores a gradation level corresponding to the desired density. A hexadecimal value form 00 to FF can be set in the register 1217. A selector 1219 selects either of the hexadecimal value set in the register 1217 or a hexadecimal value 00, according to each pixel data of the intermediate gradation level image plane 11. Therefore, the hexadecimal value set in the register 1217 is output from the selector 1219 when the pixel data is "1", and the hexadecimal value 00 is output when the pixel data is "0". The intermediate gradation level image data from the selector 1219 and the 1-bit image data are synthesized in the selector 1271 controlled by the synthesis controller 1229.

In accordance with the fourth embodiment, the circuit constitution shown in FIG. 12 is included in a circuit for each color, therefore, each circuit is provided with an intermediate gradation level image plane. However, when the density of each pixel is not required to be changable, the bit patterns of respective colors are the same. Therefore, the intermediate gradation level image plane 11 can be commonly used.

Figure 13:
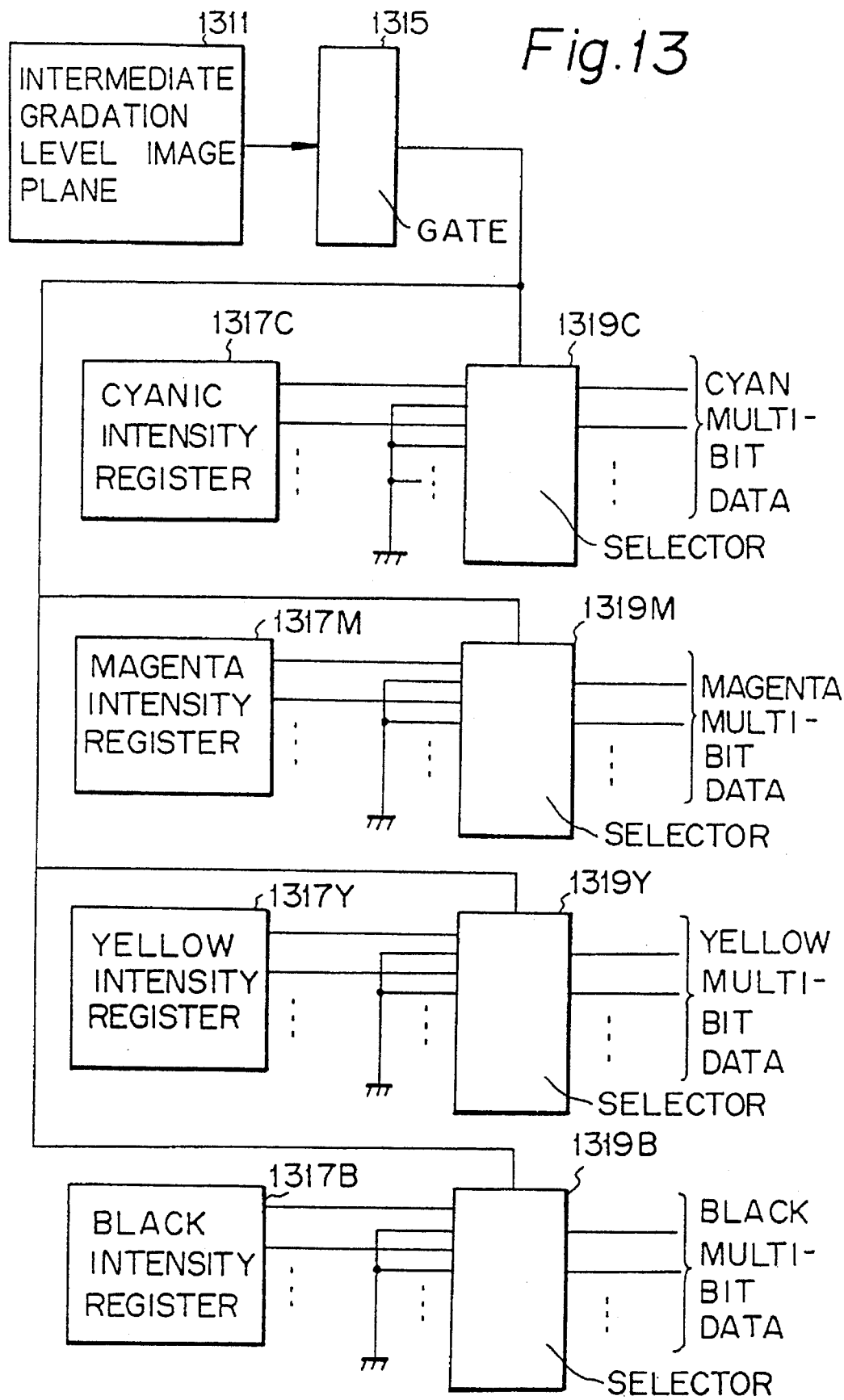
FIG. 13 is a circuit diagram of the color image printing apparatus in accordance with a fifth embodiment of the present invention.

FIG. 13 is a diagram of a fifth preferred embodiment of the present invention. As shown in FIG. 13, only one intermediate gradation level image plane 1311 is included and selectors 1319C, 1319M, 1319Y and 1319B of respective colors are commonly controlled by the output data of the intermediate gradation level image plane 1311. Multi-bit image data output from these selectors are respectively synthesized with corresponding 1-bit image data.

Figure 14:
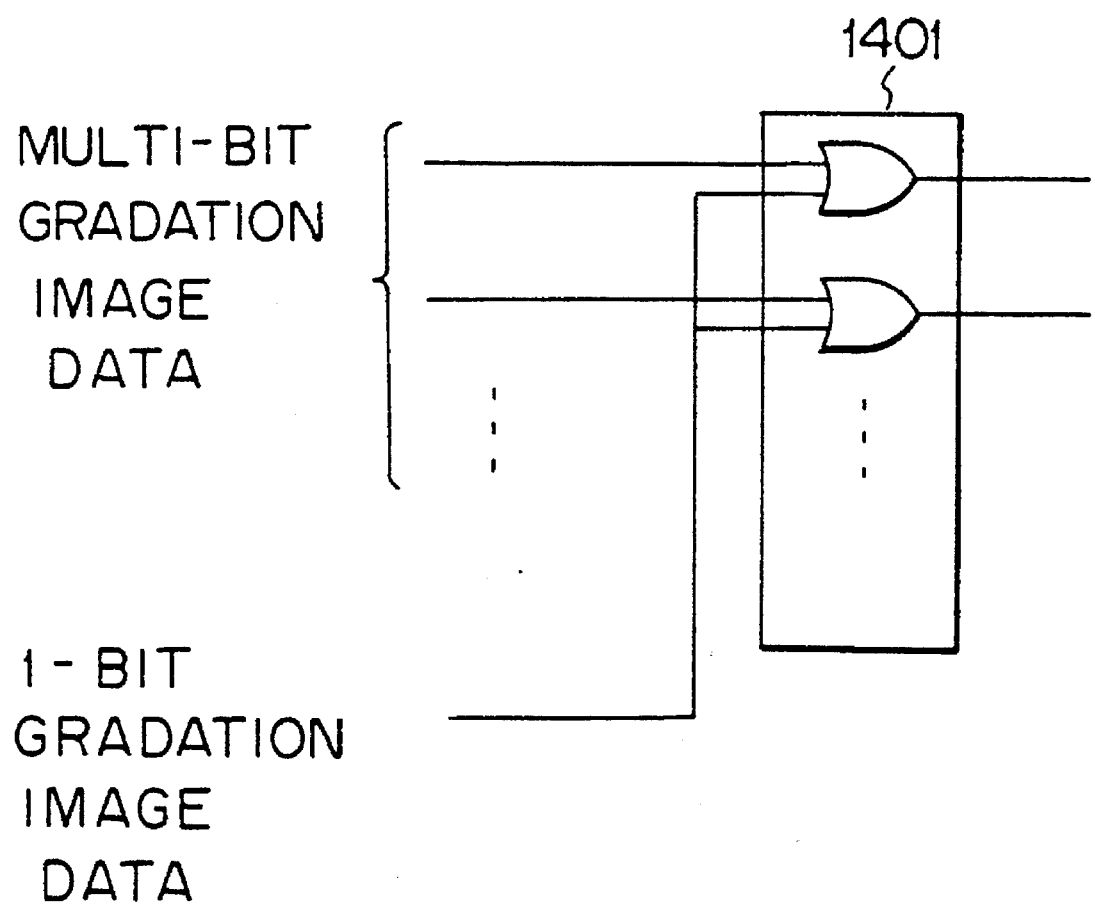
FIG. 14 is a circuit diagram of a synthesizer in accordance with a sixth embodiment of the present invention.

In the embodiments described above, the synthesizer replaces the 1-bit image data with the multi-bit image data in the rectangular areas. However, other processing methods are also available. FIG. 14 shows an example in which OR gates logically add the multi-bit image data to the 1-bit image data. AND gates and NOR gates and so forth can be used in the place of the OR gates. By using these logical gates, many kind of processing, such as masking, are available.

FIG. 15 is a diagram showing a color display according to a preferred embodiment of the present invention. In the color display, color components of red, green and blue are used. Therefore, three pairs of multi-bit and 1-bit image planes are included in correspondence with respective colors. Other portions except this point are almost same to those of the color printing apparatus, therefore, explanations relating to the color display apparatus are omitted.

I claim:

1. An image output apparatus for outputting a gradation image based on image data, the gradation image having a plurality of pixels, in which a gradation level of every pixel can be controlled, the image output apparatus comprising:

multi-bit gradation image storing means for storing first expanded image data in a form corresponding to coordinates of output image, each pixel of the first expanded image data having multi-bit data representing the gradation level of the pixel;

1-bit gradation image storing means for storing second expanded image data in a form corresponding to the coordinates of output image, each pixel of the second expanded image data having 1-bit data representing one of an ON state or an OFF state for each pixel of the second expanded image data, the gradation level of an area of the gradation image, composed of said plurality of pixels is represented by a ratio of pixels of the ON state to the OFF state;

expansion means for generating said first expanded image data and said second expanded image data from the image data according to attribute data related to the image data, the attribute data including the kind of the image data and expansion positions corresponding to the coordinates of output image said first expanded image data being stored in said multi-bit gradation image storing means and said second expanded image data being stored in said 1-bit gradation image storing means; and;

synthesis means for synthesizing the first expanded image data from said multi-bit gradation image storing means with the second expanded image data from said 1-bit gradation image storing means and outputting a multi-bit gradation image.

2. An image output apparatus for outputting a gradation image based on image data, the gradation image having a plurality of pixels, in which a gradation level of every pixel of said gradation image can be controlled, the image output apparatus comprising:

first 1-bit gradation image storing means for storing first expanded image data in a form corresponding to coordinates of output image, each pixel of the first expanded image data having 1-bit data representing one of two different gradation levels;

a register for storing gradation level data which indicates the gradation level of the first expanded image data stored in said first 1-bit gradation image storing means;

second 1-bit gradation image storing means for storing second expanded image data in a form corresponding to the coordinates of output image, each pixel of the second expanded image data having 1-bit data which represents one of an ON state or an OFF state for each pixel of the second expanded image data, the gradation level of an area of the gradation image composed of said plurality of pixels is represented by a ratio of pixels of the ON state to the OFF state;

expansion means for generating said first expanded image data and said second expanded image data according to attribute data related to the image data, the attribute data including the kind of the image data and expansion positions corresponding to the coordinates of output image said first expanded image data being stored in said first 1-bit gradation image storing means and said second expanded image data being stored in said second 1-bit gradation image storing means; and synthesis means for synthesizing the first expanded image data from said first 1-bit gradation image storing means with the second expanded image data from said second 1-bit gradation image storing means, said synthesis means comprising conversion means for converting said first expanded image data into multi-bit expanded image data having gradation levels corresponding to said gradation level data stored in said register.

* * * * *